United States Patent
Demay et al.

(10) Patent No.: US 6,374,169 B1
(45) Date of Patent: Apr. 16, 2002

(54) APPARATUS AND METHOD FOR CONSERVING POWER ON AN EARTH MOVING MACHINE HAVING A MOBILE COMMUNICATOR

(75) Inventors: Rodney W. Demay, Peoria; Daniel C. Wood, East Peoria, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/404,014

(22) Filed: Sep. 23, 1999

(51) Int. Cl.$^7$ .............................. G06F 7/70; G06G 7/76
(52) U.S. Cl. ...................... 701/50; 307/10.1; 307/10.7; 320/136
(58) Field of Search .................. 701/50, 115; 713/300, 713/310, 322, 323, 324, 604; 710/9, 16, 18; 340/426, 429, 331; 320/136, 163, 134; 342/357.12; 184/6, 6.4, 6.19; 307/10.1, 10.7, 9.1, 30, 38; 455/230, 231, 343

(56) References Cited

U.S. PATENT DOCUMENTS

| | | | |
|---|---|---|---|
| 5,418,537 A | | 5/1995 | Bird .............................. 342/357 |
| 5,469,553 A | * | 11/1995 | Patrick ........................ 713/323 |
| 5,490,073 A | | 2/1996 | Kyrtsos ........................ 364/449 |
| 5,554,993 A | | 9/1996 | Brickell ........................ 342/357 |
| 5,561,330 A | * | 10/1996 | Crook ........................ 290/30 R |
| 5,592,173 A | | 1/1997 | Lau et al. ..................... 342/357 |
| 5,823,295 A | * | 10/1998 | Griffith et al. ................ 184/6.4 |
| 5,848,376 A | | 12/1998 | Steiner et al. ................ 701/213 |
| 5,864,221 A | * | 1/1999 | Downs et al. ................ 320/134 |
| 5,874,914 A | | 2/1999 | Krasner ....................... 342/357 |
| 5,883,594 A | | 3/1999 | Lau .............................. 342/357 |
| 5,902,352 A | | 5/1999 | Chou et al. ................... 709/102 |
| 5,926,404 A | * | 7/1999 | Zeller et al. ................. 364/707 |
| 5,929,604 A | * | 7/1999 | Irvin ........................... 320/136 |
| 5,930,516 A | * | 7/1999 | Watts, Jr. et al. ............ 713/322 |
| 5,991,279 A | * | 11/1999 | Haugli et al. ................ 370/311 |
| 5,999,876 A | * | 12/1999 | Irons et al. .................. 701/115 |
| 6,028,505 A | * | 2/2000 | Drori ........................... 340/426 |
| 6,052,646 A | * | 4/2000 | Kirkhart et al. ............. 701/213 |
| 6,055,479 A | * | 4/2000 | Kirkhart et al. ............. 701/213 |
| 6,059,843 A | * | 5/2000 | Kirkhart ....................... 701/213 |
| 6,144,110 A | * | 11/2000 | Matsuda et al. ............ 307/10.1 |

* cited by examiner

*Primary Examiner*—Jacques H. Louis-Jacques
(74) *Attorney, Agent, or Firm*—W. Bryan McPherson, III; Kelsey L. Milman (57) ABSTRACT

The present invention provides a method and apparatus for conserving power on a machine having a mobile communicator. The method includes the steps of determining a current status of the machine, determining a duration since entering the current status, and determining one of a plurality of power conservation modes in response to the current status, and the status duration.

38 Claims, 3 Drawing Sheets

Fig. 2.

APPARATUS AND METHOD FOR CONSERVING POWER ON AN EARTH MOVING MACHINE HAVING A MOBILE COMMUNICATOR

TECHNICAL FIELD

The present invention relates generally to mobile machines, and more particularly, to an apparatus and method for conserving power on an machine having a mobile communicator.

BACKGROUND ART

A mobile communicator may be used on an earth moving machine to communicate with a remote data facility. The mobile communicator may receive machine parameters and associated information from the machine and deliver the information to the remote data facility continuously, intermittently, periodically, or when requested to by the remote data facility. The communicators are generally in a fully powered state when they communicate with the remote data facility. However, leaving the communicator in a fully powered state all the time will drain the battery on the earth moving machine, if the machine engine is not running.

The present invention is directed to overcoming one or more of the problems identified above.

DISCLOSURE OF THE INVENTION

In one aspect of the present invention, a method for conserving power on an machine having a mobile communicator is disclosed. The method includes the steps of determining a current status of the earth moving machine, determining a duration since entering the current status, and determining one of a plurality of power conservation modes in response to the current status duration.

In another aspect of the present invention, a method for conserving power on a machine having a mobile communicator is disclosed. The method includes the steps of determining a current status of the machine, determining a duration since entering the current status, determining a duration of a current power conservation mode, and determining a subsequent power conservation mode in response to the status, duration, and the current mode duration.

In yet another aspect of the present invention, an apparatus for conserving power on an machine having a mobile communicator and an engine is disclosed. The apparatus includes a timing mechanism adapted to generate a timing signal, and a controller adapted to receive the timing signal, determine a current status of the machine, determine a status duration in response to said timing signal, and determine one of a plurality of power conservation modes in response to said status duration.

In yet another aspect of the present invention, an apparatus for conserving power on an machine having a mobile communicator and an engine, is disclosed. The apparatus includes a timing mechanism adapted to generate a timing signal, and a controller adapted to receive said timing signal, determine a current status of the machine, determine a status duration in response to said timing signal, determine a current power conservation mode, and select one of a plurality of subsequent power conservation modes in response to the current status duration, and the current mode duration.

BEST MODE FOR CARRYING OUT THE INVENTION

The present invention provides a method and apparatus for conserving power on an machine having a mobile communicator. In the preferred embodiment, the machine is an earth moving machine, however, the invention is equally applicable to other applications and machines such as generator sets, pumps, and stationary and marine engine applications.

Figure 1:
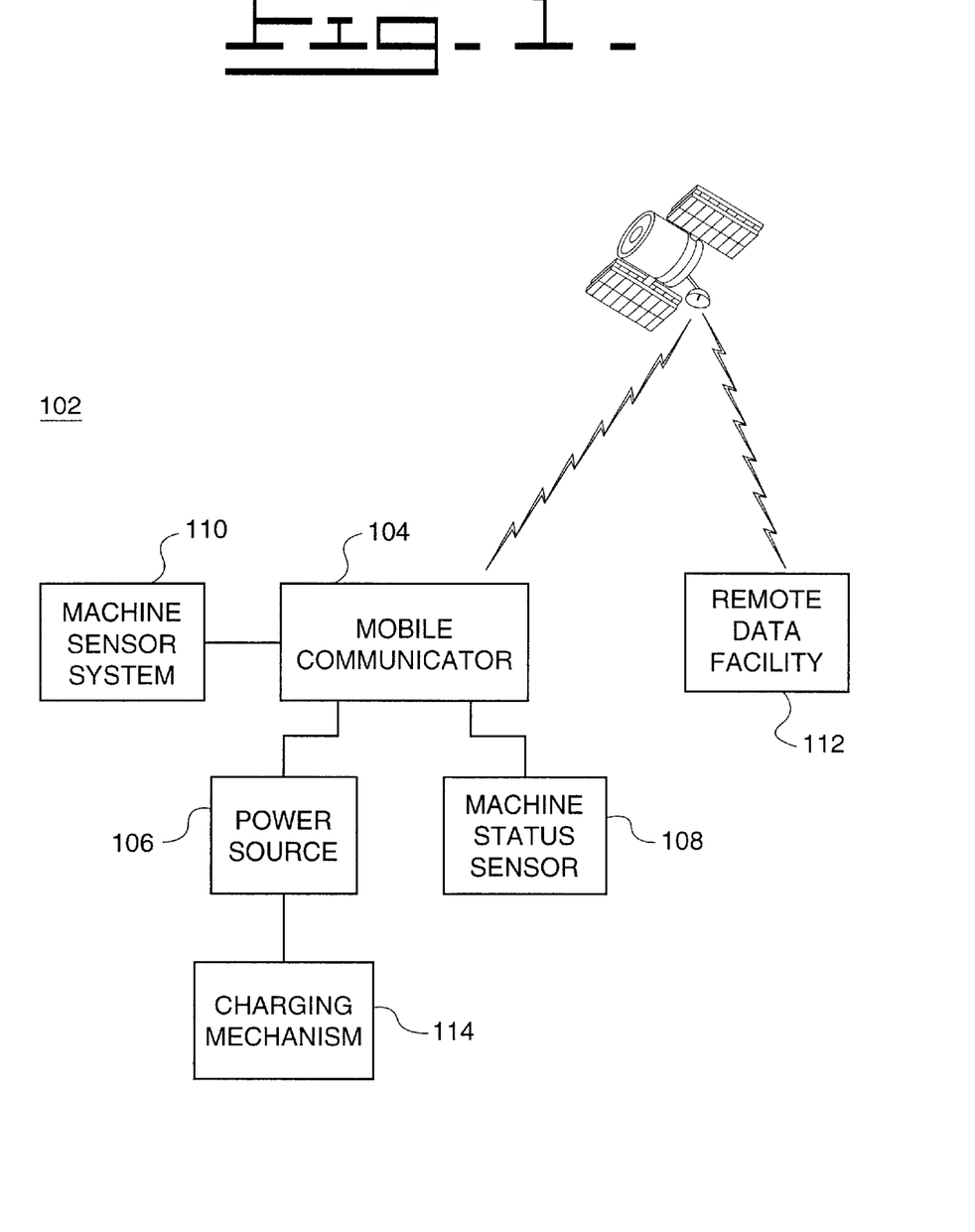
FIG. 1 is an illustration of one embodiment of a mobile communication system.

FIG. 1 is an illustration of one embodiment of a mobile communication system 102. The machine may include a machine sensor system 110, a power source 106, and a mobile communicator 104. The machine sensor system 110 may include a plurality of on-board sensors (not shown) for measuring machine parameters, such as service meter hours, fluid levels, fluid pressure, oil temperature, and machine diagnostics. The sensor system 110 may include an onboard information manager (not shown) for receiving the signals from the sensors and calculating other machine parameters based on the sensor data. The machine sensor system 110 may deliver the sensed parameters to the mobile communicator 104. For example, in one embodiment, the sensor system 110 may include a GPS receiver and associated hardware and software, for receiving machine location related information. Based on the location information, the information manager may determine the location of the machine, and then deliver the information to the mobile communicator 104, which may in turn deliver the information to a remote data facility 112. In addition, the information manager may receive a signal indicative of the oil temperature, and responsively determine if a temperature threshold has been exceeded. An oil temperature status may then be passed on to the mobile communicator 104 to be delivered to the remote data facility 112. Alternatively, the mobile communicator 104 may include an information manager (not shown) to receive and process the sensed parameters before communicating them to the remote data facility 112.

The mobile communicator 104 is adapted to receive the sensor data and/or associated machine parameters and responsively deliver the information to the remote data facility 112. The mobile communicator 104 communicates with a remote data facility 112 via a communication link. In the preferred embodiment the communication link is a satellite communication link. However, other communication link alternatives include radio links, cellular telephone links, and other communication systems capable of delivering information between two locations. A further description of the operation of the mobile communicator 104 will be provided below. In addition, the mobile communicator 104 includes a controller, e.g., a microprocessor, illustrated in FIG. 3. The controller is adapted to determine one of a plurality of power conservation modes for the mobile communicator 104 to operate in.

A remote data facility 112 may be used to send and receive information from the mobile communicator 104. In one embodiment, for example, the remote data facility 112 may initiate a request for information from the mobile communicator 104, receive the requested information, and then either deliver the information to an end-user, or perform post-processing/analysis on the information before delivering it to an end user. The end-user may be located either on-site, i.e., at the remote data facility 112, or offsite.

A power source 106 is included on the machine. In the preferred embodiment, the power source is a battery, and provides power to the machine, as well as the mobile communicator 104. However other alternative forms of a power source may be used, such as a backup battery (not shown) which, in one embodiment, may be charged by the mobile communicator 104 when the machine engine is running. The backup battery may be utilized if the primary battery is unable to provide sufficient power. In an alternative embodiment, the power source that is used to provide power to the communicator 104 may be separate from the power source 106 used to provide power to the machine.

The machine may include a charging mechanism 114 associated with the power source 106. In one embodiment, the charging mechanism 114 may be an alternator. The alternator 114 charges the battery 106 when the machine engine (not shown) is running.

In one embodiment, the mobile communication system 102 may include a machine status sensor system 108 adapted to determine a status of the machine. In the preferred embodiment, the machine status includes an active status in which the machine engine is running, and an inactive status in which the machine engine is not running, i.e., off. The machine status sensor system 108 is adapted to sense a machine parameter indicative of whether the machine is running. In the preferred embodiment, the machine status sensor system 108 is adapted to sense when the battery 106 is being charged by the alternator 114. In one embodiment, the machine status sensor system 108 monitors the current level being delivered to the battery 106. When the current level exceeds a predetermined value, the battery 106 may be determined to be charging. In one embodiment, the machine may be determined to be active, or running, when the battery is charging.

Alternative techniques for determining when the engine is running include monitoring the battery voltage, sensing the oil pressure, and monitoring the keyswitch state. These alternative techniques include alternative hardware and/or software implementations for the machine state sensing system 104.

Figure 2:
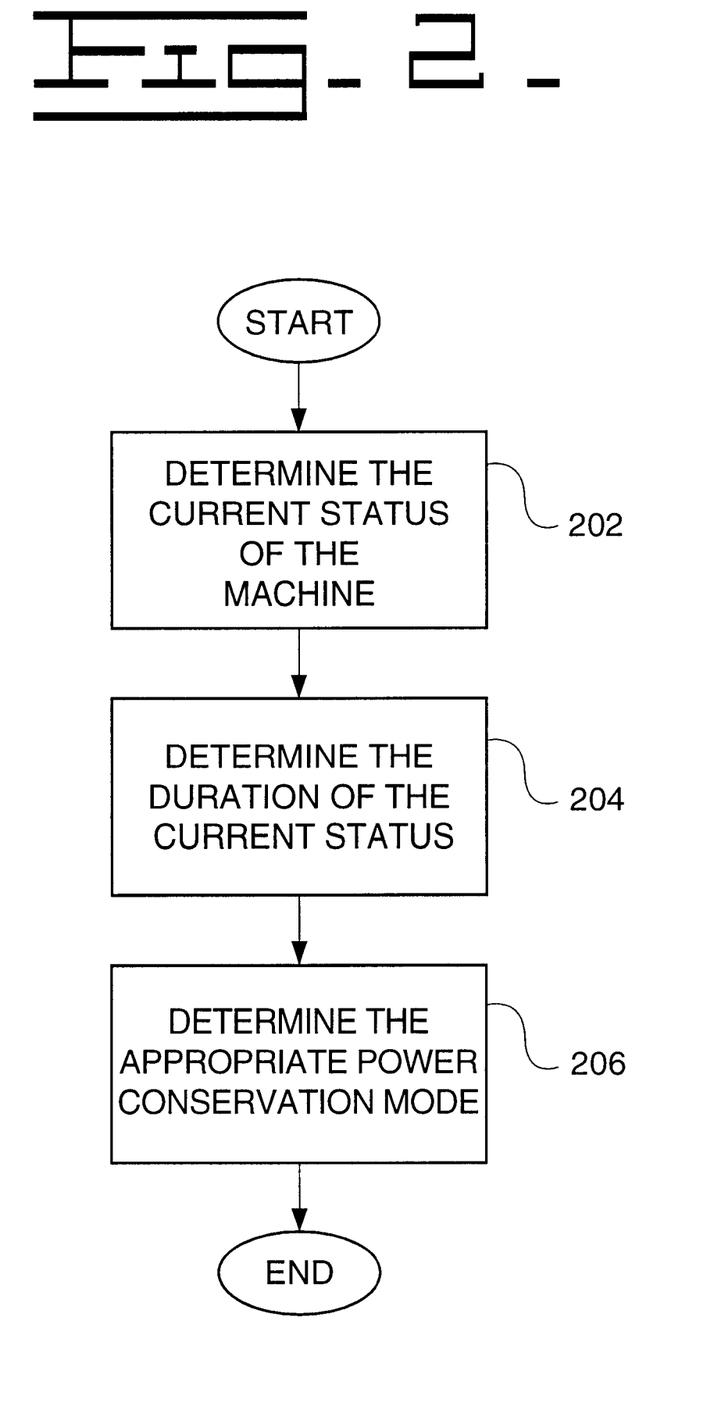
FIG. 2 is an illustration of one embodiment of a method for conserving power on an earth moving machine.

FIG. 2 illustrates one embodiment of the method of the present invention. The present invention includes a method for conserving power on an earth moving machine having a mobile communicator 104. The method includes the steps of determining a current status of the earth moving machine, determining a duration, or elapsed time, since entering the current status, and determining one of a plurality of power conservation modes in response to the current status and the status duration. The method may be implemented in software which is executed on the controller associated with the mobile communicator 104.

In a first control block 202 the current status of the machine is determined. In one embodiment, the current status may include an active status and an inactive status. The status may be determined to be active when the engine (not shown) of the machine is running. The status may be determined to be inactive when the machine engine is not running. As described above, in one embodiment, when the current level delivered to the battery 106 from the alternator 114 exceeds a predetermined value, the battery may be determined to be charging, and therefore the machine is running. In the preferred embodiment, the status of the machine is determined in response to determining whether the battery is charging.

In a second control block 204 the duration, or elapsed time, since entering the current status is determined. For example, the amount of time the machine has been either inactive (off), or active (running) is monitored.

In a third control block 206 the appropriate power conservation mode is determined in response to the current status of the machine, and the status duration.

In the preferred embodiment, each power conservation mode has a plurality of states, or submodes. The appropriate state is determined in response to the current power conservation mode, and the duration, or elapsed time, spent in the current state.

In one embodiment of the present invention, there are four power conservation modes, and two states. The power conservation modes include an active mode, initially inactive mode, intermediate inactive mode, and dormant mode. The number of power conservation modes is a function of the application and may be expanded or reduced as necessary to achieve the desired power consumption goals. For example there may be only an active mode and an inactive mode corresponding to whether the machine is running or off. Selecting among the inactive power modes is determined in part, based on the duration which the communicator 104 has been in the current mode, as will be described below. The duration guidelines may be used to determine when to transition from one inactive mode to another, are also a function of the application and may be expanded or reduced as necessary to achieve the desired power consumption goals.

The two states, or submodes, of each power conservation mode, may include the ready state and the sleep state. The ready state refers to the state in which the mobile communicator 104 is capable of receiving and transmitting information. The sleep state generally refers to the state in which the mobile communicator 104 is in the off position, i.e., the communicator 104 is using reduced power, or is powered down. Preferably the communicator 104 does not send or receive messages from the remote data facility 112 when the communicator 104 is in the sleep state. Alternatively however, the communicator 104 may be able to send and/or receive messages from the remote data facility 112 when the communicator 104 is in the sleep state.

Figure 3:
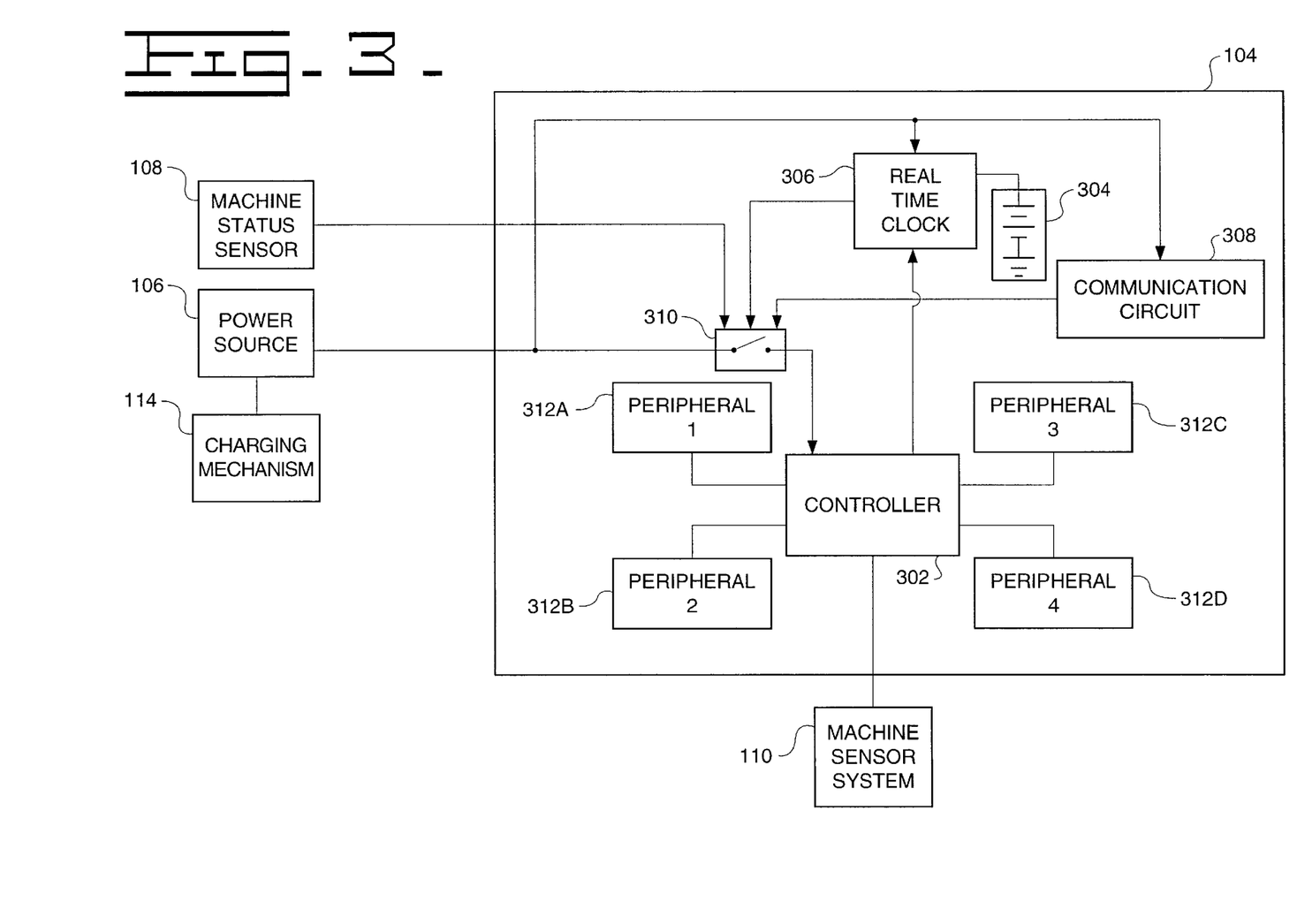
FIG. 3 is an illustration of one embodiment of a mobile communicator.

FIG. 3 illustrates one embodiment of a mobile communicator 104. The mobile communicator 104 includes a communication circuit 308 for communication with the remote data facility 112. The communication circuit 308 may be a radio, for example. The communicator 104 may include a controller 302 adapted to receive machine information and deliver it to the communication circuit 308 for delivery to the remote data facility 112. The communicator 104 may include one or more peripherals 312 associated with the controller 302. The communicator 104 also includes a timing mechanism 306, e.g., a real time clock, and an associated secondary power supply 304. The communicator 104 also includes a power switch 310. In one embodiment, in the sleep state, the power switch 310 is open, and the controller 302 and associated peripherals 312 are powered down to conserve power. The communicator 104 may transition from the sleep state to the ready state when the power switch 310 is closed, thereby providing power to the controller 302 and associated peripherals 312. The power switch 310 may be closed when the machine state sensor 108 detects the machine engine has been turned on, e.g., the battery is being charged, or the keyswitch state of the machine is closed enabling the machine to run. In addition, the power switch 310 may be closed when the timing mechanism 306 reaches a particular count, e.g., three minutes have elapsed so send a signal to the power switch 310 to provide. power to the controller 302. When the machine engine is turned off and the real time clock is not activating the power switch 310, the power switch 310 returns to the open position, and the controller 302 and associated peripherals are powered down. The real time clock 306 is a very low power drain on the power source 106.

Therefore, the mobile communicator 104 is able to send and receive messages when the communicator 104 is in the ready state, i.e., the circuitry is powered up, and may not send or receive messages in the sleep state, i.e., the circuitry, e.g., controller 302 and peripherals 312, is powered down. As mentioned earlier, in an alternative embodiment, the communicator 104 may be able to send and or receive messages in the sleep state.

The communication circuitry 308 may include a circuit module, a modem, a radio, or other analogous communication hardware and software. In one embodiment, the communication circuit 308 may contain a separate, but identical, power conservation strategy and similar associated circuitry. For example, when the controller 302 is powered up, the communication circuitry 308 is also powered up, and when the controller 302 is powered down, the communication circuitry 308 is also powered down. In this embodiment, the communication circuit 308 may also provide an input to the power switch, such that, if the communication circuit 308 becomes powered up, and the controller 302 has not yet been powered up, the communication circuit 308 may power the controller 302 up via the power switch 310. In an alternative embodiment, only one power conservation strategy and associated circuitry is used for the mobile communicator 104 in order to control the communication circuit 308, the controller 302, and associated peripherals 312.

When the current status of the machine is determined to be active, i.e., the machine is determined to be running, the mobile communicator 104 enters the active mode. While in the active mode, the mobile communicator 104 operates in the ready state. That is, the mobile communicator 104 is capable or transmitting or receiving messages to/from the remote data facility 112 at any time during the active mode.

When the engine is determined to have stopped running, i.e., the machine status has become inactive, the power conservation mode transitions to the initially inactive state. During the initially inactive state, the mobile communicator 104 toggles between operating in the ready state for a first specified period of time and then transitioning to the sleep state for a second specified period of time, then returning to the ready state, and repeating the sequence. The second time period is approximately the same duration as the first time period. For example, the communicator 104 may operate in the ready state for three minutes followed by operating in the sleep state for three minutes, then repeating this sequence.

When the engine has been inactive for longer than a first predetermined threshold, e.g., forty eight hours, the power conservation mode may transition to an intermediate inactive state. In the intermediate inactive state, the communicator 104 toggles between operating in the ready state for a first specified amount of time, and then transitioning into the sleep state for a second specified amount of time, where the second time period is greater than the first time period. For example, the communicator 104 may operate in the ready state for three minutes out of every six hours, then transition to the sleep state for the remaining five hours and fifty-seven minutes, and then repeat the sequence.

When the engine has been inactive for longer than a second period of time, e.g., two weeks, the power conservation strategy transitions from the intermediate inactive state, to a dormant state. In the dormant state, the communicator 104 toggles between operating in the ready state for a first specified amount of time, and then transitioning into sleep state for a second specified amount of time, where the second time period is much greater than the first time period. For example, the communicator 104 may operate in the ready state for three minutes out of every twenty four hours, then transition to the sleep state for the remaining twenty three hours and fifty-seven minutes, then repeat the sequence.

When the engine is determined to have started running, the power conservation mode transitions from whatever mode it is currently in, e.g., the initially inactive mode, intermediate inactive mode, or dormant mode, to the active mode, enabling the communicator 104 to operate continuously in the ready state.

In an alternative embodiment, the power conservation modes may include a ready mode and a sleep mode, which correspond to the ready state and the sleep state described with respect to FIG. 2. That is, the ready mode refers to the mode in which the mobile communicator 104 is capable of receiving and transmitting information. The sleep mode generally refers to the mode in which the mobile communicator 104 is in the off position, i.e., the communicator 104 is using reduced power, or is powered down, such that the communicator 104 is unable to send or receive messages from the remote data facility 112.

The alternative embodiment includes the steps of determining a current status of the machine, and determining a duration since entering the current status, as described above, with reference to FIG. 2. In addition, the method of the alternative embodiment includes the step of determining one of a plurality of power conservation modes in response to said current status and said status duration. In this embodiment, the power conservation modes includes a ready mode, or state, and a sleep mode, or state. The step of determining one of a plurality of power conservation mode includes the steps of determining the duration of the current power conservation mode, and then transitioning into a subsequent power conservation mode in response to the current status, the status duration, and the current mode duration. In one embodiment, when the current status of the machine is active, the power conservation mode remains in the ready mode. When the machine engine has been turned off for less than a first predetermined threshold, e.g., forty eight hours, the current status of the machine becomes inactive. When the machine status becomes inactive, the power conservation mode toggles between the ready mode and the sleep mode based on the duration of the current conservation mode, and the duration of the current machine status. When the machine status is has been inactive for less than forty eight hours, the power consumption mode toggles between operating in the ready mode for a specified period of time and then transitioning to the sleep mode for approximately the same time period. For example, the power conservation mode may toggle between operating in the ready mode for three minutes and then the sleep mode for three minutes. Therefore the transition into a subsequent mode is based on the current status of the machine, e.g., inactive, the duration of the current status, e.g., less than forty eight hours, and the duration of the current mode, e.g., after three minutes transition into the alternative mode.

When the machine has been inactive for more than the first predetermined threshold, and less than a second predetermined threshold, e.g., two weeks, the power consumption mode may transition between operating in the ready mode for a first specified time period and then transition into the sleep mode for a second specified time period, where the second time period is greater than the first time period. For example, the communicator 104 may operate in the ready mode for three minutes out of every six hours, and then transition into the sleep mode for the remaining five hours and fifty-seven minutes. Therefore the transition into a subsequent mode is based on the current status of the machine, e.g., inactive, the duration of the current status, e.g., greater than forty eight hours, and the duration of the current mode, e.g., after operating in the ready mode for three minutes, the power consumption mode transitions into the sleep mode, for five hours and fifty seven minutes, and then repeats the sequence.

When the machine has been inactive for more than the second predetermined threshold, e.g., two weeks, the power mode may transition between operating in the ready mode for a first specified time period and then transition into the sleep mode for a second specified time period, where the second time period is much greater than the first time period. For example, the communicator 104 may operate in the ready mode for three minutes out of every twenty four hours, and then transition into the sleep mode for the remaining twenty three hours and fifty-seven minutes, and then repeating the sequence. Therefore the transition into a subsequent mode is based on the current status of the machine, e.g., inactive, the duration of the current status, e.g., greater than two weeks, and the duration of the current mode, e.g., after three minutes transition into the ready mode transition into the sleep mode, or after twenty four hours and fifty seven minutes in the sleep mode, transition into the ready mode.

In an alternative embodiment, the mobile communicator 104 may be instructed to enter a particular node by the user, or the remote data facility 112. For example, the communicator 104 may be operating in the dormant mode, e.g., the machine has been off for over two weeks, and the communicator 104 operates in the ready state for three minutes out of every twenty four hours. The remote data facility 112 may send a message to the communicator 104 when the communicator 104 is in the ready state, commanding the communicator 104 to operate, for example, in the active mode, or the initial inactive mode, in order to enable more frequent correspondence between the communicator 104 and the data facility 112.

Industrial Applicability

The present invention provides a method and apparatus for conserving power on a machine having a mobile communicator 104. The method includes the steps of determining a current status of the machine, determining a duration since entering the current status, and determining one of a plurality of power conservation modes in response to the current status, and the status duration.

In one embodiment, the power conservation modes include an active mode, initially inactive mode, intermediate inactive mode, and dormant mode. When the machine status is active, i.e., the machine is determined to be running, the power consumption mode is active. In the active mode, the communicator operates in a ready state. In the ready state the communicator may transmit or receive messages from the remote data facility on an as needed basis.

When the machine enters an inactive state, i.e., the engine stops running, the communicator 104 transitions into an initially inactive mode. The initially inactive mode enables the communicator 104 to operate in the ready state enough to communicate any necessary machine information to the remote facility. For example, since the machine has just been turned off, information such as machine diagnostic information may need to be collected, and then delivered to the remote data facility 112. Therefore, the mobile communicator 104 operates in the ready state frequently, to insure any wrap up correspondence between the remote data facility 112 and the communicator 104 may be concluded.

When the communicator 104 operates in the intermediate inactive mode, the machine has been turned off for more than forty eight hours. The use of this mode recognizes that the amount of information that is needed to be transmitted to the remote data facility is reduced, or does not need to be transmitted as often since the machine has not been operated in at least two days. For example, the intermediate inactive mode provides the remote data facility 112, i.e., the end-user, a slightly smaller window to correspond with the mobile communicator 104 to in the event that the end-user may need time to review and conclude any diagnostic information etc., and associated processing.

When the communicator 104 operates in the dormant mode, the machine has been turned off for more than two weeks. The use of the dormant mode recognizes that the amount of information needed to be transmitted to the remote facility is minimal, e.g., current location information, since the machine has not be turned on in over two weeks. The information on the machine is unlikely to have changed at this point, and the remote data facility 112 has less need for correspondence since machine information has not changed. While the type of data sent in the three power conservation modes may be the same, the likelihood of the end-user requesting the data diminishes the longer the machine engine has been powered down. Therefore, the mobile communicator 104 can operate in the sleep state with more frequency the longer the machine engine has been turned off.

Other aspects, objects, and advantages of the present invention can be obtained from a study of the drawings, the disclosure, and the claims.

What is claimed is:

1. A method for conserving power on an machine having a mobile communicator, including the steps of:
   determining a current status of the machine;
   determining a duration since entering said current status;
   determining one of a plurality of power conservation modes in response to said current status and said status duration, wherein each said mode includes a state, said state including at least a ready state and a sleep state.

2. A method, as set forth in claim 1, wherein said current status includes an active status and an inactive status.

3. A method, as set forth in claim 2, wherein the machine includes an engine, and wherein the step of determining said current status of the machine includes the step of determining said machine engine is one of running and not running.

4. A method, as set forth in claim 3, wherein the step of determining said machine engine is one of running and not running includes the step of monitoring a parameter indicative of said machine engine running, wherein said current status is determined in response to said monitored parameter.

5. A method, as set forth in claim 4, wherein said machine includes a battery and an associated battery charging mechanism, said battery adapted to provide power to the machine wherein the step of monitoring said parameter includes the step of monitoring one of said battery charging mechanism, a battery voltage, a machine oil pressure, and a keyswitch state of said machine.

6. A method, as set forth in claim 5, wherein the step of determining said current status of the machine includes the step of determining said status is active when said monitored parameter indicates said machine engine is running.

7. A method, as set forth in claim 6, wherein said modes includes an active mode, wherein the step of determining one of a plurality of modes includes the step of selecting said active mode in response to said machine status being active, and placing said communicator in said ready state in response to said active mode.

8. A method, as set forth in claim 7, wherein said modes include an initially inactive mode, intermediate inactive mode, and a dormant mode.

9. A method, as set forth in claim 1, including the step of determining said state in response to said power conservation mode and said duration.

10. A method for conserving power on a machine, said machine including an engine, a mobile communicator, a battery, an associated battery charging mechanism, said battery adapted to provide power to the machine, including the steps of:

determining a current status of the machine, wherein a parameter indicative of said machine engine running is monitored to determine if said machine engine is running or not running, wherein said current status is determined in response to said monitored parameter, said parameter including one of said battery charging mechanism, a battery voltage, a machine oil pressure, and a keyswitch state of said machine, said current status including an active status if said monitored parameter indicates said machine engine is running and an inactive status if said machine engine is not running;

determining a duration since entering said current status;

determining one of a plurality of power conservation modes in response to said current status and said status duration, said modes including an active mode, an initially inactive mode, an intermediate inactive mode, and a dormant mode, each of said modes including a state, said state including at least one of a ready state and a sleep state, said active mode being selected in response to said machine status being active, said communicator being placed in said ready state in response to said active mode, said initially inactive mode being selected in response to said machine status transitioning from said active status to said inactive status, said initially inactive mode enabling the communicator to toggle between said ready state and said sleep state.

11. A method, as set forth in claim 10, wherein the step of determining one of a plurality of modes includes the step of selecting said intermediate inactive mode in response to said machine status being inactive for a time duration greater than a first time period.

12. A method, as set forth in claim 11, wherein the step of determining one of a plurality of modes includes the step of selecting said dormant mode in response to said machine status being inactive for a duration greater than a second time period, said second time period being greater than said first time period.

13. A method for conserving power on an machine having a mobile communicator, including the steps of:

determining a current status of the machine;

determining a duration since entering said current status;

determining a duration of a current power conservation mode; and determining a subsequent power conservation mode in response to said current status, said status duration, and said current mode duration.

14. A apparatus for conserving power on an machine having a mobile communicator and an engine, comprising:

a timing mechanism adapted to generate a timing signal;

a controller adapted to receive said timing signal, determine a current status of the machine, determine a status duration in response to said timing signal, and determine one of a plurality of power conservation modes in response to said current status and said status duration, wherein each said mode includes a state, said state including at least a ready state and a sleep state.

15. An apparatus, as set forth in claim 14, wherein said current status includes an active status and an inactive status, said active status indicating said machine engine is running, said inactive status indicating said machine is not running.

16. An apparatus, as set forth in claim 15 including a machine status sensor system adapted to monitor a parameter indicative of said current status, and responsively generate a machine status signal; and wherein said controller is further adapted to receive said machine status signal and responsively determine said current status.

17. An apparatus, as set forth in claim 16, wherein said machine includes a power source and an associated charging mechanism, said power source adapted to provide power to the machine; and wherein said machine status sensor signal is indicative of one of said power source being charged, a machine engine oil pressure, and a keyswitch state of said machine.

18. An apparatus, as set forth in claim 14, wherein said controller is further adapted to determine said state in response to said power conservation mode and said state duration.

19. An apparatus, as set forth in claim 18, wherein said modes includes an active mode, and wherein said controller is further adapted to select said active mode in response to said machine status being active, and placing said communicator in said ready state in response to said active mode.

20. An apparatus, as set forth in claim 19, wherein said modes include an initially inactive mode, intermediate inactive mode, and a dormant mode.

21. An apparatus for conserving power on a machine having a mobile communicator and an engine, comprising:

A timing mechanism adapted to generate a timing signal,

A controller adapted to receive said timing signal, determine a current status of the machine, determine a status duration in response to said timing signal, determine one of a plurality of power conservation modes in response to said current status and said status duration, said modes including an active mode, an initially inactive mode, an intermediate mode, and a dormant mode, each of said modes including a state, said state including at least one of a ready state and a sleep state, said current status including an active status and an inactive status, said active status indicating said machine engine is running, said inactive status indicating said machine engine is not running, said controller farther adapted to determine said state in response to said power conservation mode and said state duration, to select said active mode in response to said machine status being active, to place said communicator in said ready state in response to said active mode, and to select an initially inactive mode in response to said machine status transitioning from said active status to said inactive status, said initially inactive mode enabling the communicator to toggle between said ready state and said sleep state.

22. An apparatus, as set forth in claim 21, wherein said controller is further adapted to select an intermediate inactive mode in response to said machine status being inactive for a time duration greater than a first time period.

23. An apparatus, as set forth in claim 22, wherein said controller is further adapted to select a dormant mode in response to said machine status being inactive for a duration greater than a second time period, said second time period being greater than said first time period.

24. An apparatus for conserving power on a machine having a mobile communicator and an engine, comprising:

A timing mechanism adapted to generate a timing signal; and

A controller adapted to receive said timing signal, determine a current status of the machine, determine a status duration in response to said timing signal, and determine one of a plurality of power conservation modes in response to said current status and said status duration, wherein each said mode includes a state, said state including at least one of a ready state and a sleep state, wherein said controller determines a duration of a current power conservation mode, and selects said power conservation mode in response to said current status, said current status duration, and said current mode duration.

25. A apparatus for conserving power on an machine having a mobile communicator and an engine, comprising:

a timing mechanism adapted to generate a timing signal;

a controller adapted to receive said timing signal, determine a current status of the machine, determine a status duration in response to said timing signal, and determine a current power conservation mode, and select one of a plurality of subsequent power conservation modes in response to said current status, said status duration, and said current mode duration.

26. An apparatus, as set forth in claim 25, wherein said current status includes an active status and an inactive status, said active status indicating said machine engine is running, said inactive status indicating said machine is not running.

27. An apparatus, as set forth in claim 26, including a machine status sensor adapted to monitor a parameter indicative of said current status, and responsively generate a machine status signal; and wherein said controller is further adapted to receive said machine status signal and responsively determine said current status.

28. A method for conserving power on a machine having a communicator, including the steps of:

determining a current status of the machine;

determining a duration since entering said current status;

selecting one of a plurality of power conservation modes in response to said current status and said status duration, said modes including at least a sleep state and a ready state; and selecting said mode states in response to a time criteria.

29. A method, as set forth in claim 28, wherein the step of selecting one of said mode states further includes the step of vacillating between at least two of said mode states in response to said time criteria.

30. A method, as set forth in claim 28, wherein said time criteria varies in response to said selected mode.

31. A method, as set forth in claim 28, wherein the step of selecting one of said modes states further includes the steps of:

selecting said sleep state;

selecting said ready state in response to said sleep state; and returning to said sleep state in response to said ready state.

32. A method, as set forth in claim 31, wherein the step of selecting said ready state further includes the steps of:

determining a sleep duration since entering said sleep state; and selecting said ready state in response to said sleep duration exceeding a first time threshold.

33. A method, as set forth in claim 31, wherein the step of returning to said sleep state further includes the steps of:

determining a ready duration since entering said ready state; and returning to said sleep state in response to said ready duration exceeding a second time threshold.

34. A method for conserving power on a machine having a communicator, including the steps of:

determining a current status of the machine;

determining a duration since entering said current status when said machine status is inactive;

transitioning back and forth between at least two power conservation modes in response to a time criteria when said machine status is inactive; and varying the time criteria in response to said status duration.

35. A method, as set forth in claim 34, wherein said power conservation modes include a ready mode and a sleep mode, and further wherein the step of vacillating between said modes further includes the steps of:

selecting said sleep state;

selecting said ready state in response to said sleep state and said time criteria; and returning to said sleep state in response to said ready state and said time criteria.

36. A method, as set forth in claim 35, wherein the step of selecting said ready state further includes the steps of:

determining a sleep duration since entering said sleep state; and selecting said ready state in response to said sleep duration exceeding a first time threshold.

37. A method for conserving power on a machine having a communicator, including the steps of:

determining a current status of the machine;

transitioning from a first power conservation mode to a second power conservation mode, and back to said first power conservation mode in response to a time criteria when said current status is inactive.

38. A method, as set forth in claim 37, further including the steps of:

determining the duration of said current status;

varying said time criteria in response to said status duration.

\* \* \* \* \*

UNITED STATES PATENT AND TRADEMARK OFFICE
CERTIFICATE OF CORRECTION

PATENT NO. : 6,374,169 B1
DATED : April 16, 2002
INVENTOR(S) : Rodney W. Demay et al.

It is certified that error appears in the above-identified patent and that said Letters Patent is hereby corrected as shown below:

<u>Column 10,</u>
Line 54, remove the word "farther" and replace with -- further --.

Signed and Sealed this

Eighteenth Day of June, 2002

*Attest:*

*Attesting Officer*

JAMES E. ROGAN
*Director of the United States Patent and Trademark Office*